(12) United States Patent
van Zijderveld et al.

(10) Patent No.: US 6,601,696 B1
(45) Date of Patent: Aug. 5, 2003

(54) BEND SEGMENT FOR THE TRACK OF A CHAIN CONVEYOR

(75) Inventors: George Johannes van Zijderveld, 's-Gravenzande (NL); Franciscus Josephus M. van Esch, Breda (NL)

(73) Assignee: MCC Nederland B.V., Gravenzande (NL)

(*) Notice: Subject to any disclaimer, the term of this patent is extended or adjusted under 35 U.S.C. 154(b) by 0 days.

(21) Appl. No.: 09/720,712

(22) PCT Filed: Jun. 30, 1999

(86) PCT No.: PCT/NL99/00402
§ 371 (c)(1),
(2), (4) Date: May 21, 2001

(87) PCT Pub. No.: WO00/00415
PCT Pub. Date: Jan. 6, 2000

(30) Foreign Application Priority Data

Jun. 30, 1998 (NL) .............................................. 1009526

(51) Int. Cl.[7] .............................................. B65G 15/60
(52) U.S. Cl. ...................................................... 198/805
(58) Field of Search ................................... 198/805, 841

(56) References Cited

U.S. PATENT DOCUMENTS

| | | | | |
|---|---|---|---|---|
| 4,742,906 A | * | 5/1988 | Wallaart | ...................... 198/805 |
| 5,027,942 A | * | 7/1991 | Wallaart | ...................... 198/805 |
| 5,165,527 A | * | 11/1992 | Garbagnati | ................. 198/805 |

* cited by examiner

*Primary Examiner*—Joseph E. Valenza
(74) *Attorney, Agent, or Firm*—Varnum, Riddering, Schmidt & Howlett LLP (57) ABSTRACT

A bend segment for the track of a chain conveyor comprising at least two spaced, preferably flexible rails (4, 5) forming a track for the carrying surface of chain links (30), permanent magnets arranged below the track of the chain and flexible guide rails (11, 12) for guiding the return part of the chain, a number of supporting elements for supporting the rails being provided, which supporting elements are spaced in the conveying direction of the conveyor, the permanent magnets being accommodated in chambers (24, 24') formed in an elongate, preferably flexible strip which is also supported on the supporting elements. The invention enables inexpensive manufacture of a bend segment of different lengths and radii.

5 Claims, 7 Drawing Sheets

BEND SEGMENT FOR THE TRACK OF A CHAIN CONVEYOR

BACKGROUND OF THE INVENTION

1. Field of the Invention

The invention relates to a bend segment for the upper part of the track of a chain conveyor comprising at least two spaced rails forming a track for the carrying surface of chain links and permanent magnets arranged below the track of the chain.

The invention also provides a bend segment for the return part of the track of a chain conveyor comprising two spaced rails for guiding the sides of the carrying surfaces of chain links.

2. Description of Related Art

EP-A-0 325 333 discloses such bend segments for the upper part and the return part of the track of a chain conveyor. Both the upper part and the return part comprise a U-shaped element, the magnets being arranged in the legs of the U-shaped element of the upper part at the upper face of these legs forming the rails for guiding the sides of the carrying surface of the chain links. In this known bend segment the legs of the U-shaped element for the upper part are open in the direction of the longitudinal axis of the bend segment and form a chamber for accommodating the magnets, the legs with the magnets therein are closed by means of a flexible strip or a further U-shaped element. The U-shaped element for the return part is provided with slots for guiding the sides of the carrying surfaces of the chain links.

EP-A-0 159 074 also discloses such a bend segment in which in the upper part the magnets are arranged in the legs of a U-shaped bend segment, and EP-A-0 286 173 also discloses such a bend segment in which the magnets are arranged in the connecting part between the legs of a U-shaped bend segment. In such bend segments the magnets serve to keep the carrying surfaces of the chain links containing a ferromagnetic material or completely made of ferromagnetic material flat on the track in the bend segments forming part of the track of a chain conveyor. Without the downward force exerted by the magnets the chain links, as a result of the pulling force exerted on the chain, tend to move upwards in the outer bend or even come off the bend owing to which the articles conveyed on the chain can fall off the chain, which is of course undesirable.

The known bend segments are largely made of polyethylene having an ultra-high molecular weight, so-called UHMWPE. This material is molded under high pressure into plates, from which plates the bend segments can be formed by milling. This method of manufacture has a number of drawbacks. In the first place, as a result of the milling process, much loss of material occurs, up to more than 50%, which makes the bend expensive. In the second place, the polyethylene, also if allowed to rest for a considerable period of time after molding, is not quite free from material stresses. Consequently, also after milling a bend segment is not quite free from stresses, which is undesirable.

Dutch patent application 1003738 discloses that, to save on the cost price of a bend segment, this bend segment is not manufactured by means of milling, but by means of injection molding. This solution is economical indeed, but has the drawback that, in particular for small series of one type of bend segment, the cost of the injection molding die is high. After all, each type of bend segment has its own die.

Furthermore, EP-A-0 207 577 discloses a bend segment for a chain conveyor consisting of spaced magnets each positioned around an axis, with ferromagnetic bushes placed against these magnets. Such magnet assemblies are provided against metal plate-shaped rails, on which rails chain links made of ferromagnetic metal run. Provided on the interior and exterior of the rails are different plastic filler and guide strips. This known bend segment can be easily manufactured in various dimensions, that is to say with different radii and lengths, and is relatively insensitive to fouling. A drawback is that the construction is very complex and can in no way be automated. Moreover, this known bend is only suitable for chains having a ferromagnetic carrying surface, because only at the upper side of the metal rails the magnetic field is sufficiently strong. The bend is not suitable for plastic chains of the type described in EP-A-0 286 173.

SUMMARY OF THE INVENTION

The object of the invention is to provide a fundamentally different solution for the manufacture of a bend segment for the track of a chain conveyor, for both metal and plastic chains, thus enabling a very easy and inexpensive manufacture of this bend segment with a very high flexibility, without the necessity of expensive dies for each type of bend and without an appreciable loss of material.

To this end, the invention provides a bend segment for the upper part of the track of a chain conveyor comprising at least two spaced rails forming a track for the carrying surface of chain links and permanent magnets arranged below the track of the chain, characterized in that a number of supporting elements for supporting the rails are provided, which supporting elements are spaced apart in the conveying direction of the conveyor, and that the permanent magnets are accommodated in chambers formed in an elongate strip which is also supported on the supporting elements.

Preferably, the rails, at least in the conveying plane of the conveyor, are flexible, because this enables rapid and simple assembly and requires no different rails for various radii. It is also possible, however, to give the rails a rigid design for special applications. Preferably, the strip with magnets is also flexible, but here, too, a rigid design is possible for special applications.

According to a first embodiment, the bend segment for the return part of the track of a chain conveyor according to the invention is characterized in that the guide rails, at least in the conveying plane of the conveyor, are flexible in the lateral direction and are supported by a number of supporting elements spaced apart in the conveying direction of the conveyor.

Preferably, a supporting element for the rails in the upper part is always attached to a supporting element for the U-shaped rails in the return part, with or without interposition of spacer elements. It is also possible to manufacture both supporting elements as a single injection molding product.

According to a preferred embodiment the rails of the upper part are connected with the supporting elements by means of a snap or sliding connection, for which purpose the supporting elements are provided with an element suitable for a snap or sliding connection, which element can couple with a part of the rails complementary thereto. Consequently, the rails can be easily replaced in the event of wear. According to a further preferred embodiment the guide rails for the return part are also complementary to at least a part of the slots formed at the underside of the supporting elements, so that the rails can be arranged in these slots by sliding or snapping.

According to a preferred embodiment the flexible strip containing the chambers for the magnets consists of a chain consisting of a number of individual links which are capable of being hingedly coupled together, while in at least a number of links at least one chamber is formed for receiving the magnets. The chambers are formed such that, if desired, the magnets and, if required, closure plates can be automatically placed in the chambers.

Preferably, the exterior of the links is provided with means capable of coupling by means of, for instance, a sliding or snap connection with complementary means at the supporting elements of the upper part, thus enabling attachment of the strip to the successive supporting elements.

By taking the measures according to the invention a bend segment for chain conveyors is provided which combines a very low cost price with a very high flexibility and an easy exchangeability of the parts subject to wear, in particular the rails.

One of the most important aspects of the flexibility is that bends of different radii and lengths can be easily made with the supporting elements and rails according to the invention, which bends are suitable both for metal (ferromagnetic) chains and for plastic chains having a ferromagnetic hinge pin. If the supporting elements have been made suitable therefor, both single and multiple bends can be designed. Consequently, it is no longer necessary to have different types of bends on stock. A further advantage is that the bend segment, due to its very open structure, can be cleaned very easily and effectively, and that coarser dirt, such as fragments of glass, crown corks etc., cannot lead to jamming of the conveyor, because this dirt can fall through the bottom construction to the ground. Also, due to the open structure, the sound production of the chain in the bend is substantially lower than with the known massive bend segments which actually form a sound box.

The range of applications of the strip consisting of links with magnet chambers formed therein according to the invention is not limited to the use with the supporting elements for a bend segment according to the invention, also with other bend segments for chain conveyors this strip may be advantageously used. For instance with the bend segment disclosed in DE-A-3 540 002 intended for use with so-called tab chains in which the tabs engage below the rails to keep the chain flat in the bend parts of the conveyor. Bend segments suitable for flexible conveying chains can be combined with the magnet strip according to the invention, the sides of the hinges being flat for tab chains or for chains in which the hinge loops are provided with beveled parts, the chains of the so-called bevel type.

BRIEF DESCRIPTION OF THE DRAWINGS

The invention will hereinafter be explained in more detail by means of a practical example, with reference to the accompanying drawings, in which:

FIGS. 1a,b is a perspective top view and a perspective bottom view, respectively, of a supporting element for the upper part of a bend segment;

FIGS. 2a,b is a perspective top view and a perspective bottom view, respectively, of a supporting element for the return part of a bend segment;

FIGS. 3a,b is a side view of the supporting elements of FIGS. 1 and 2, respectively, which figures also shows the rails for supporting and guiding, respectively, chain links, a magnetic strip and a conveyor chain;

FIGS. 4a,b is a bottom view and a perspective view, respectively, of an element forming part of the magnetic strip according to the invention;

DETAILED DESCRIPTION

In the figures, identical parts are indicated by identical reference numerals.

Figure 1:
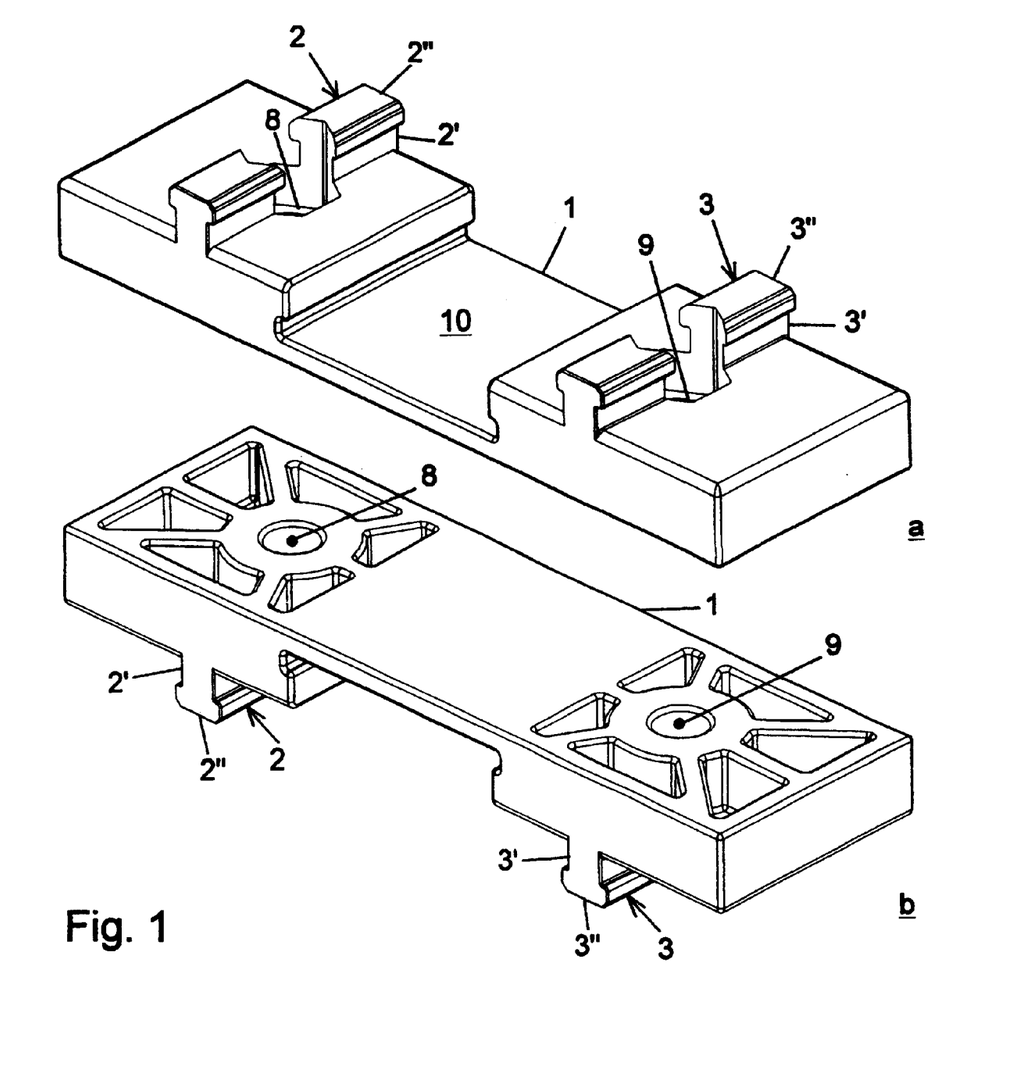
Figure 3:
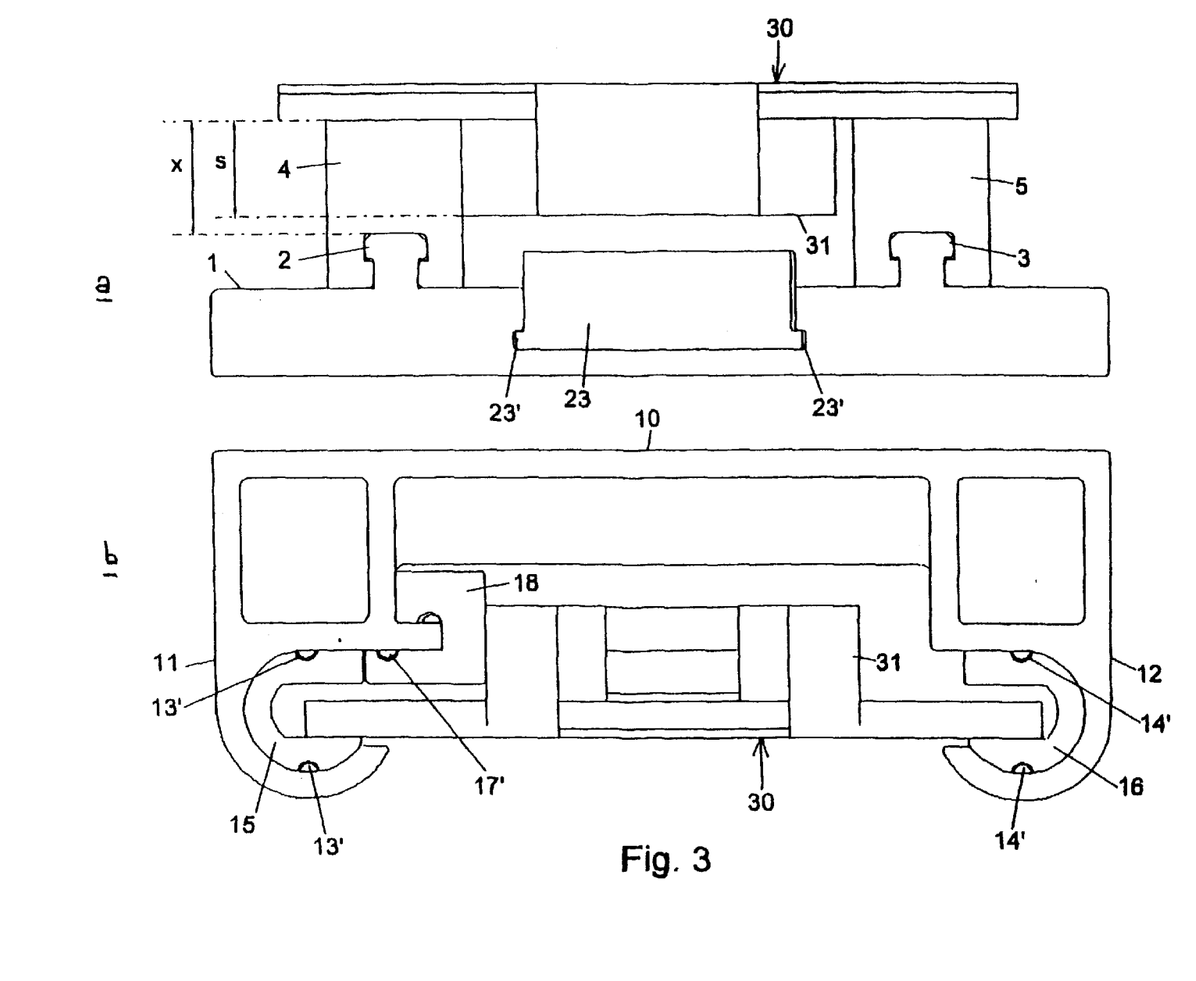

As FIGS. 1a,b and 3a show, a supporting element for the upper part of a bend segment consists of a rectangular body 1 with attaching elements 2 and 3 for the rails 4 and 5 which carry the carrying surface of a chain link 30 schematically shown in FIG. 3. These chain links are made either of a ferromagnetic material or of plastic, in the latter case the hinge pins which connect the chain links with each other being made of a ferromagnetic material. Further details concerning these chains can be found in EP-A-0 159 074 and EP-A-0 286 173. In the practical example the attaching elements 2 and 3 each consist of an upright leg 2' and 3', respectively, and a thickened end part 2" and 3", respectively. The rails 4 and 5 each consist of a rectangular plastic strip, at the underside of which a recess is formed which is complementary to the form of the attaching elements 2 and 3. In the practical example the rails are slid over the attaching elements 2 and 3. It is also possible, however, to provide a snap connection, for instance by giving the thickened ends 2" and 3" a spherical design. It is further possible to provide the supporting elements with slots and the rails with projections complementary thereto. In the supporting element openings 8 and 9 are formed to attach this element to a carrying construction or to a supporting element for the lower part, as will be explained in more detail. The openings 8 and 9 are formed such that the head of a screw or bolt can be recessed therein, seen from the upper side of the supporting element, via a recess in the attaching elements 2 and 3, respectively.

Preferably, the body of the supporting element is provided with a recessed part 11' for receiving the magnetic strip to be discussed with reference to FIG. 5. It is advantageous to choose the height X, see FIG. 3, of the rails 4 and 5 greater than the height S of the hinge 31 of the chain link 30. Consequently, in the event of wear on the rails, which substantially takes place on the side face in the inner bend, the hinge is prevented from abutting against the attaching element 2 or 3. The distance between the upright inner edges of the rails is greater than the hinge width of chain links. As stated, however, chains of the bevel or tab type may also be used in the bend segment. The rails may be extruded or milled from, for instance, polyethylene, with or without additions, such as glass beads or glass fibers, which improve the wear properties.

Figure 2:
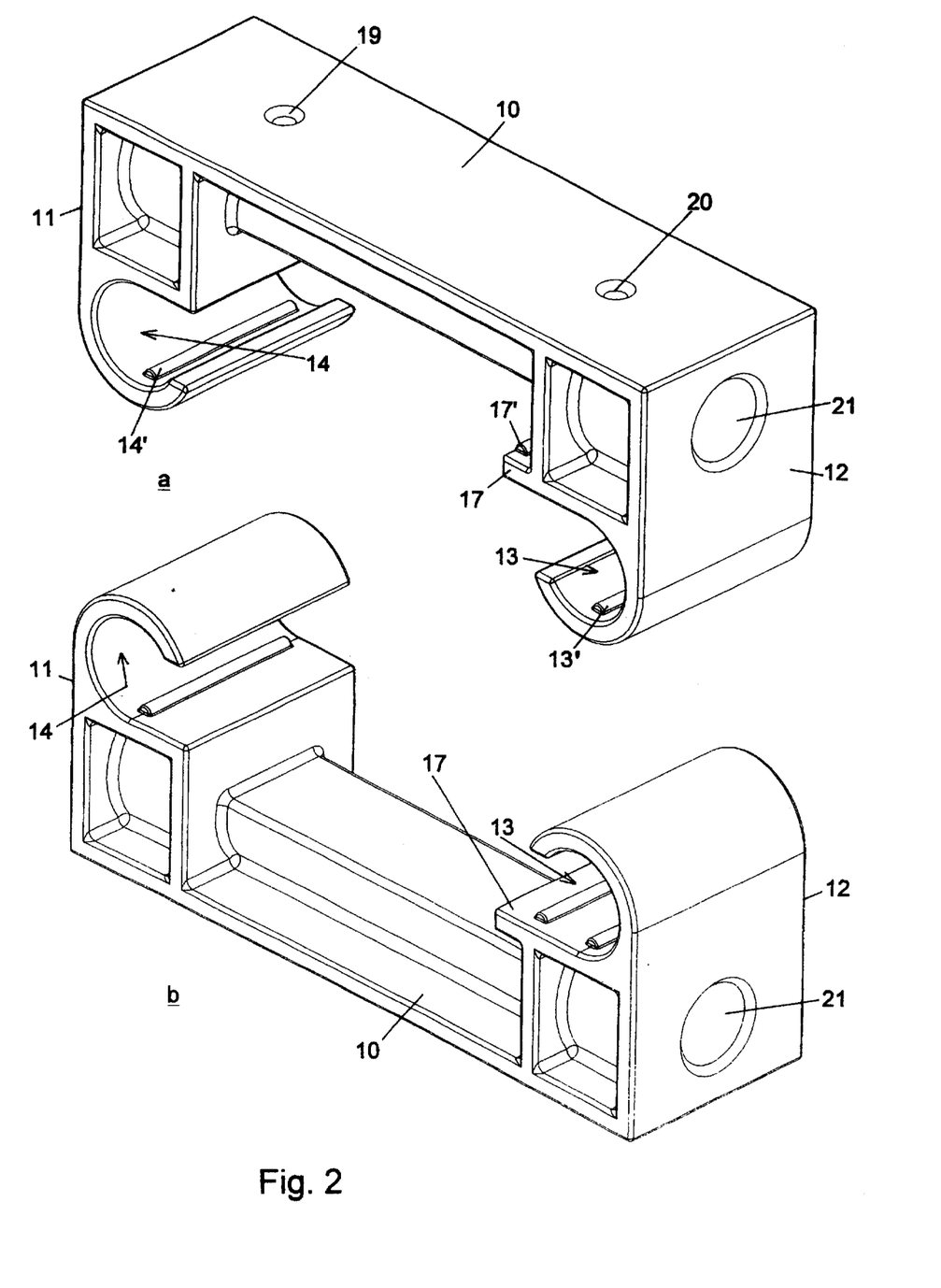

FIGS. 2a,b and 3b show a supporting element for the return part of a bend segment, consisting of a substantially rectangular body 10 with two downward directed legs 11 and 12 on the short sides and at the ends a partly circular recess 13, 14, in which, see FIG. 3, C-shaped strips 15 and 16 are received to guide the sides of the carrying surfaces of chain links, such as the link 30 shown in FIG. 3. Provided on the inner bend side of the supporting element is a laterally projecting rib 17, on which a strip 18 can be slid or snapped. This strip serves as a wear strip for guiding the upright side on the inner bend side of the hinge of the chain links and is, like strips 15 and 16, easily replaceable in the event of wear.

To prevent the strips 15, 16 and 18 from twisting, guide longitudinal ribs 13' and 14' are preferably provided in, respectively, the circular recesses 13, 14 and 17' on the Fib 17, which guide ribs can cooperate with corresponding longitudinal slots in the strips 15, 16 and 18. The strips 15, 16 and 18 may be made of polyethylene with, for instance, a glass bead addition. Provided in the upper face of the supporting element are openings 19 and 20 for receiving fastening elements, for instance bolts, which are fastened via the openings 8 and 9 of the supporting element for the upper part (see FIGS. 1, 2) in the openings 19 and 20. To this end, these openings may include threaded bushes. The side faces of the legs 13 and 14 are also provided with openings for threaded bushes, of which only threaded bush 21 is shown. These threaded bushes serve to fasten the supporting elements by means of bolts to the frame of the path construction.

Figure 4:
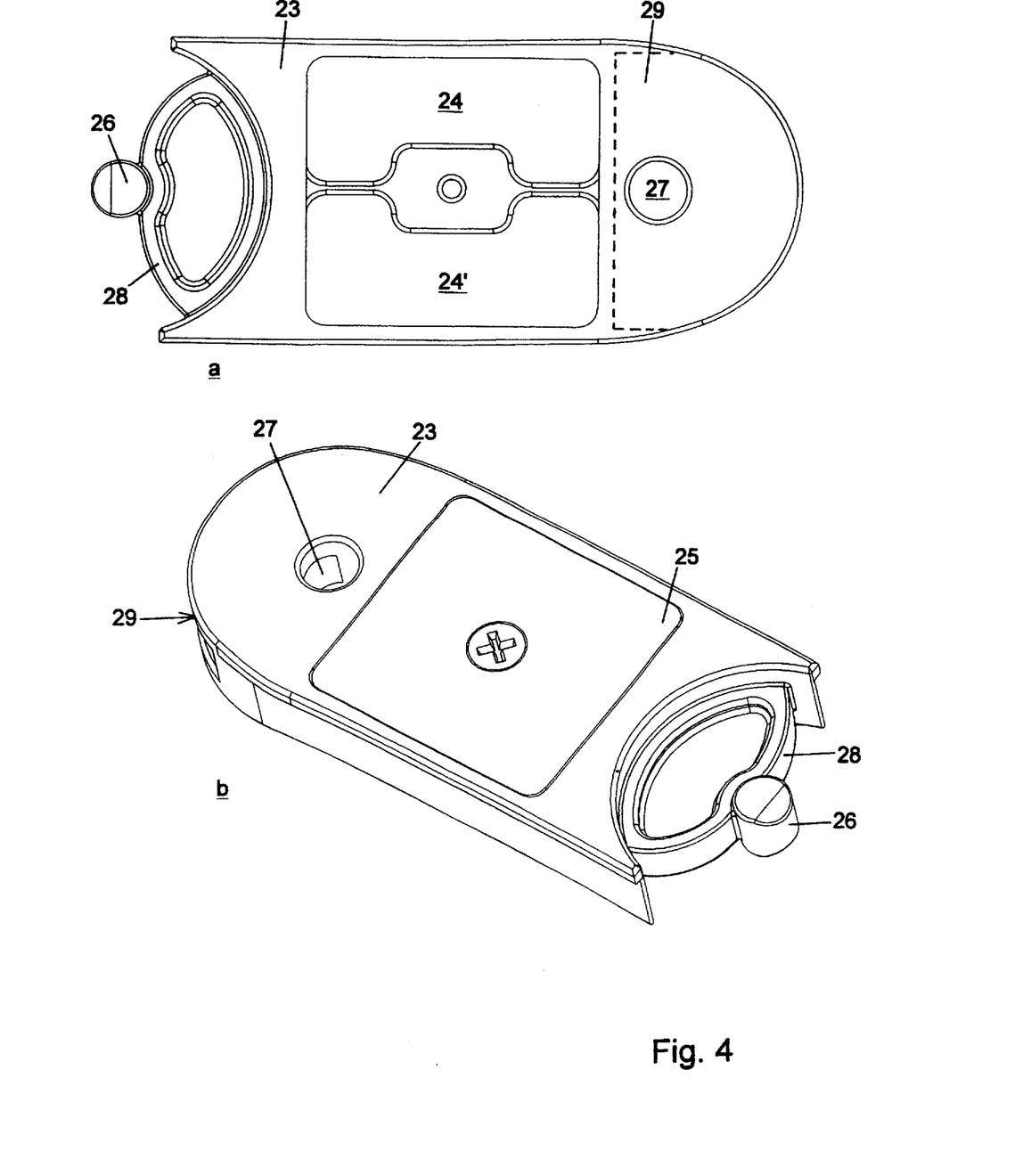

FIGS. 4a,b shows an element 23 of the magnetic strip used to keep the chain links in the bend segment flat on the rails 4, 5. FIG. 4a shows the element 23 with an open magnet chamber 24, 24', and FIG. 4b with a magnet chamber closed by a metal plate 25, preferably metal of high magnetic permeability, to optimally strengthen the magnetic field. A number of elements 23 forms, see FIG. 5, a flexible strip, rectangular in cross-section, because of the fact that of each element 23 a cam-shaped projection 26 can cooperate at the rear end with an opening 27 at the front end of an adjoining next element. To this end, the cam 26 can snap into the opening 27, because the rear end 28 of the element 23 is of thinned design and can be received in a slot 29 at the front end of a next element to obtain a flexible closed connection. Included in the magnet chambers 24, 24' are magnets, not shown, the magnetic force of which is strengthened by the metal plate 25 which can be attached to the element 23 by means of a screw. Since the magnet chambers are relatively small, strong magnets are preferably used, such as neodymium magnets. In the embodiment shown the placement of the magnets in the chambers 24, 24' and the placement of the metal closure plate 25 can be simply automated.

FIG. 3 shows a magnetic strip element 23 placed in a supporting element 1 for the upper part. Preferably, the dimensions of the magnetic strip are such that below the chain link hinges and beside the rails 4, 5 sufficient space remains to discharge dirt. The elements 23 are preferably provided with means, such as the edges 23', which can cooperate by means of a sliding or snap connection with the recessed part 1' formed in the supporting element 1. The elements 23 can, for instance, be injection molded from glass fiber reinforced polypropylene.

Figure 5:
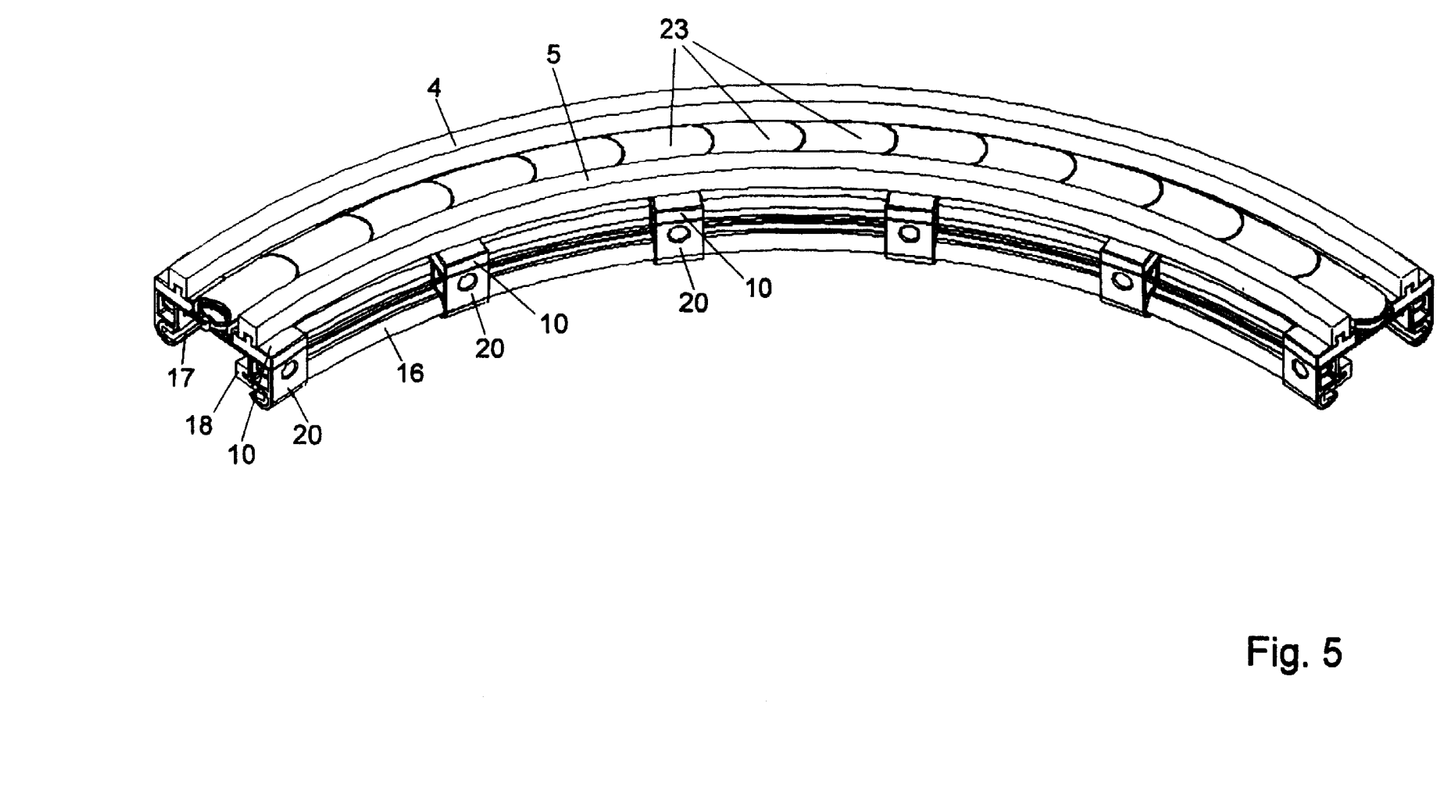
FIG. 5 is a perspective view of a bend segment consisting of a number of supporting elements for the upper and lower parts, as well as the associated rails.

FIG. 5 is a perspective view of a bend segment consisting of six supporting elements for, respectively, the upper part and the return part with the associated rails 4 and 5 and guide strips 15, 16 and 18 and a magnetic strip consisting of elements 23. In particular this figure will clearly show that because of the flexible rails 4, 5 and guide strips 15, 16 and 18 and the magnetic strip built up from short elements or links 23 it is very easy to form bends of different radii, while bends can also be simply shortened for bend segments of, for instance, 90, 60, 30 and 15°, but also all intermediate values. Moreover, FIG. 5 clearly shows the very open structure of the bend segment, which prevents fouling and allows easy removal of dirt, if present.

Figure 6:
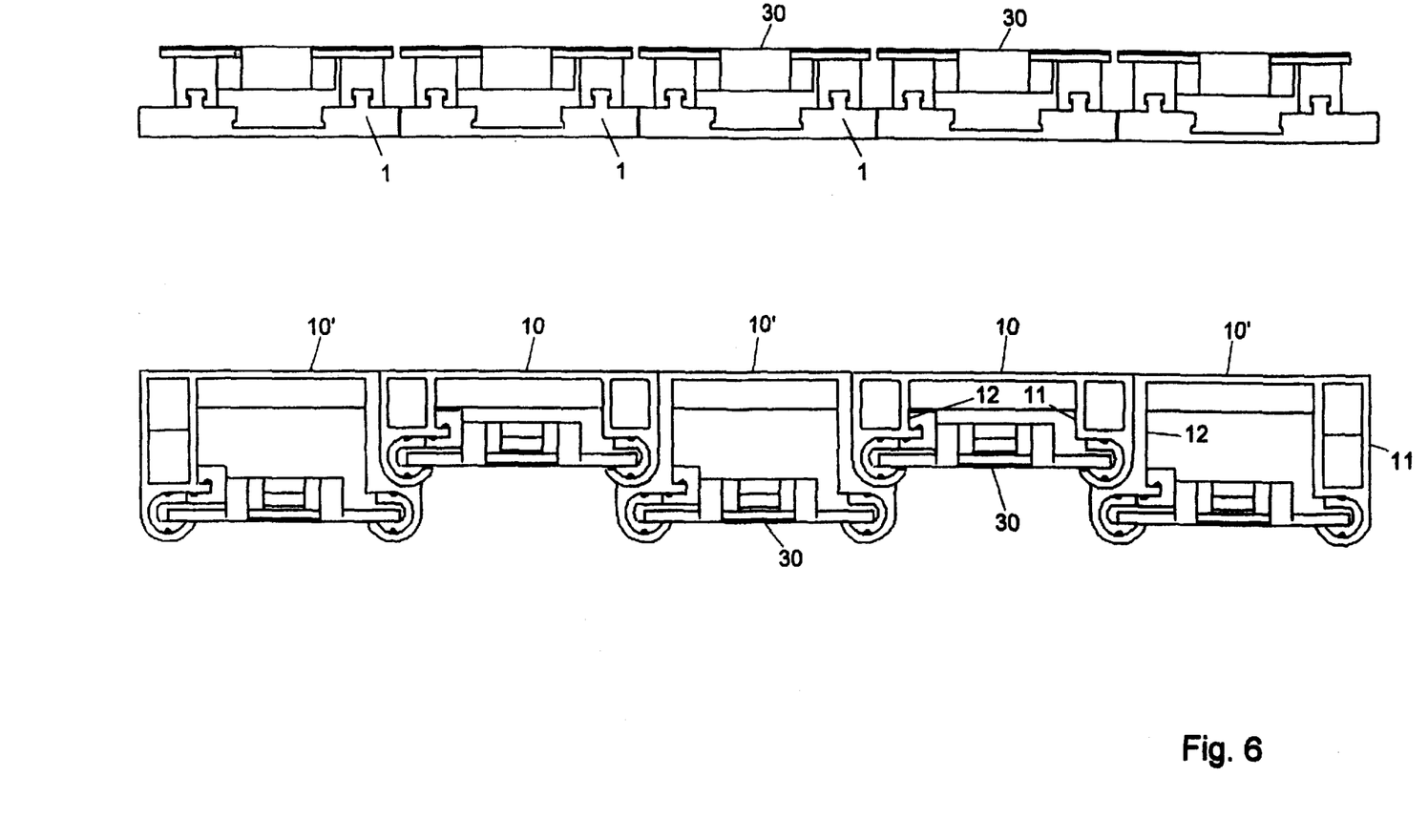
FIG. 6 is a side view of a multiple bend according to the invention.

FIG. 6 shows how a multiple bend can be constructed with the supporting elements 1 and 10 according to the invention. The upper part consists of supporting elements 1 mounted side by side, while the return part consists of alternating supporting elements 10 and 10'. The elements 1 and 10, 10' can be coupled together in different ways, such as by means of a clamping or sliding connection or by conventional connecting elements, such as bolts or screws. The elements 10 and 10' differ from each other only by the height of the legs 11, 12. These are longer in the elements 10' than in the elements 10, so that the returning chains can be guided at different heights and can slightly overlap each other. Thus the advantages described in Dutch patent application 1006082 are obtained. It is also possible, however, to build up the multiple return part only from elements 10.

Figure 7:
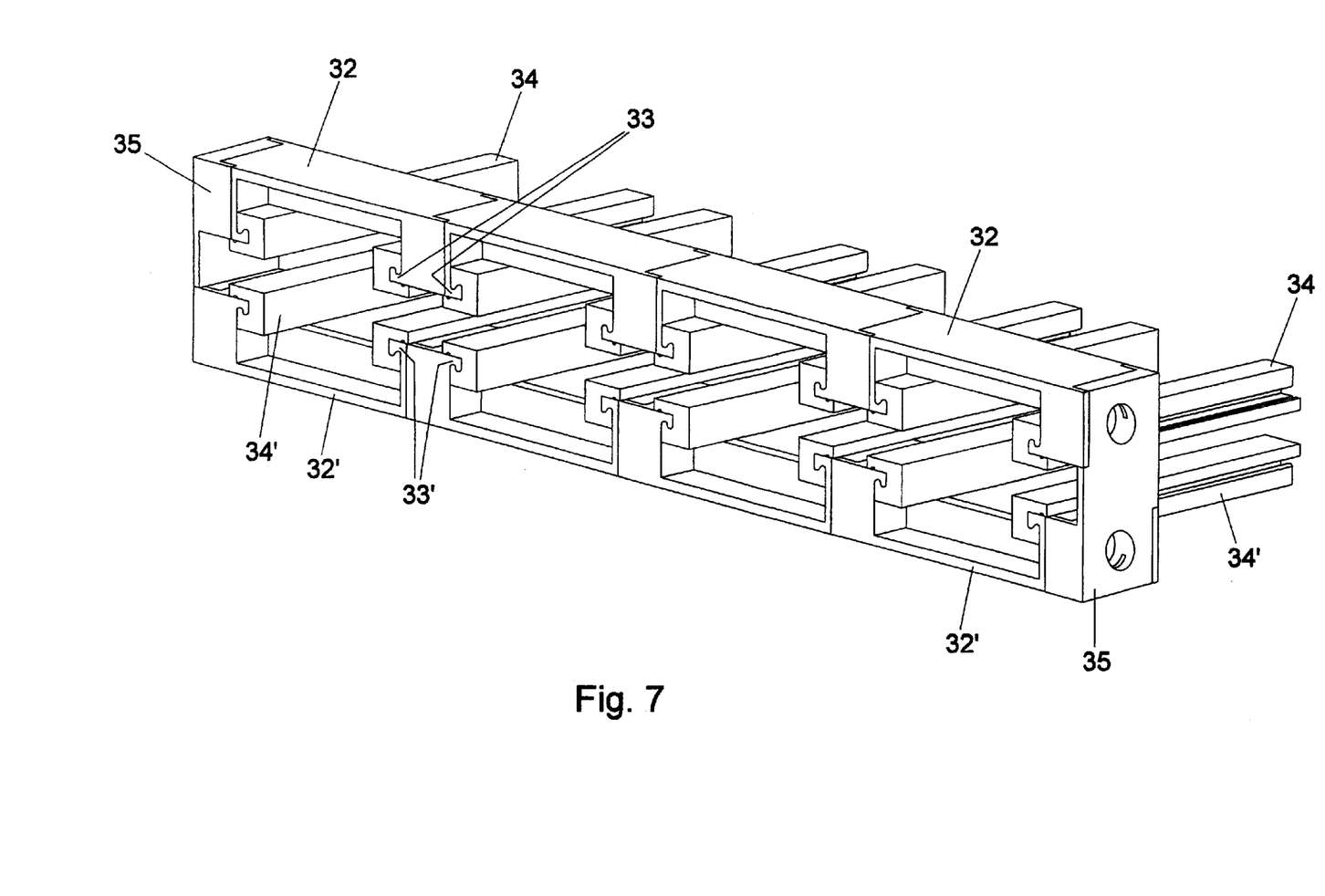
FIG. 7 is a perspective view of a second embodiment of the return part.

FIG. 7 shows a return part for a bend segment to be manufactured at a very low cost price. A 4-fold return part is shown, but it will be clear that this may be one- to n-fold. Each return part portion consists of two supporting elements 32 and 32' situated in mirror image relative to each other. Each supporting element 32 or 32' substantially is substantially U-shaped, at the ends of the legs of the U, on the inside thereof, attaching elements 33, 33' being provided for the rails 34, 34'. The rails 34, 34' are provided with projections or recesses complementary to the attaching elements 33, 33', so that the rails can be connected with the supporting elements by means of a sliding or snap connection.

If desired, the return part of FIG. 7 can be made adjustable for height, that is to say that the vertical distance between two superimposed rails 34, 34' is variable. Consequently, the return part can be made suitable for chains of different thicknesses of the carrying surface. This thickness can vary between ±2 and 25 mm, while it is yet desirable that the sides of the hinge loops are supported on the upright part of the superjacent rails. If the vertical distance were 25 mm, this requirement would not be satisfied for chains of a carrying surface thickness of 2 mm. By attaching the upper or lower supporting elements 32, 32' to the lateral supports 35 so as to be adjustable for height, this problem can be simply solved. If the upper part of the bend segment is fixed directly against the lower part, it is even possible to omit the supporting elements 32 and to directly attach the guide rails to the underside of the supporting elements.

What is claimed is:

1. A bend segment for an upper part of a track of a chain conveyor movable in a conveying direction, said bend segment comprising:

at least two spaced apart rails forming a track for carrying surfaces of chain links;

a plurality of permanent magnets arranged below said track;

a plurality of supporting elements for supporting said rails, said supporting elements being spaced apart in said conveying direction; and an elongated, flexible strip disposed below said track and supported on said supporting elements and comprising a plurality of chambers, spaced apart in said conveying direction, said permanent magnets being disposed in said chambers;

the elongated strip comprising a plurality of links movably connected with each other, certain of the links provided with chambers for receiving magnets.

2. The bend segment according to claim 1 characterised in that at least a wherein certain of the chambers are closed by a ferromagnetic metal plate.

3. The bend segment in accordance with claim 1, wherein the rails consist of plastic strips substantially rectangular in cross-section and comprise an underside and a recess in said underside for co-operating with ribs on said supporting elements to form a sliding connection.

4. A bend segment for an upper part of a track of a chain conveyor comprising at least two spaced apart rails forming a track for a carrying surface of chain links;

a plurality of supporting elements for supporting said rails, said supporting elements being spaced apart in a conveying direction of the conveyor;

a plurality of permanent magnets arranged below said track and accommodated in chambers formed in an elongated strip supporting on said supporting elements;

said rails consisting of plastic strips of substantially rectangular in cross section, each having an underside and a recess in the said underside adapted to co-operate with ribs formed at the said supporting elements to form a connecting element.

5. A bend segment for an upper part of a track of a chain conveyor movable in a conveying direction, said bend segment comprising:

at least two spaced apart rails for forming a track for carrying surfaces of chain links;

a plurality of permanent magnets arranged below said track;

a plurality of supporting elements for supporting said rails, said supporting elements being spaced apart in said conveying direction; and an elongated flexible strip disposed below said track and supported on said supporting elements, said elongated strip comprising a plurality of links movably connected with each other, certain of said links provided with chambers for receiving said permanent magnets.

* * * * *

UNITED STATES PATENT AND TRADEMARK OFFICE
CERTIFICATE OF CORRECTION

PATENT NO. : 6,601,696
DATED : December 28, 2000
INVENTOR(S) : George Johannes van Zijderveld and Franciscus J. M. van Esch It is certified that error appears in the above-identified patent and that said Letters Patent is hereby corrected as shown below:

<u>Column 6,</u>
Lines 57 through 59, should read:
-- 2. The bend segment according to claim 1 wherein certain of the chambers are closed by a ferromagnetic plate. --

Signed and Sealed this

Second Day of March, 2004

JON W. DUDAS
*Acting Director of the United States Patent and Trademark Office*